April 20, 1965
E. HATZOPOULOS
3,179,568
METHOD OF PRODUCTION AND EXTRACTION OF IODINE-131
Filed March 4, 1963
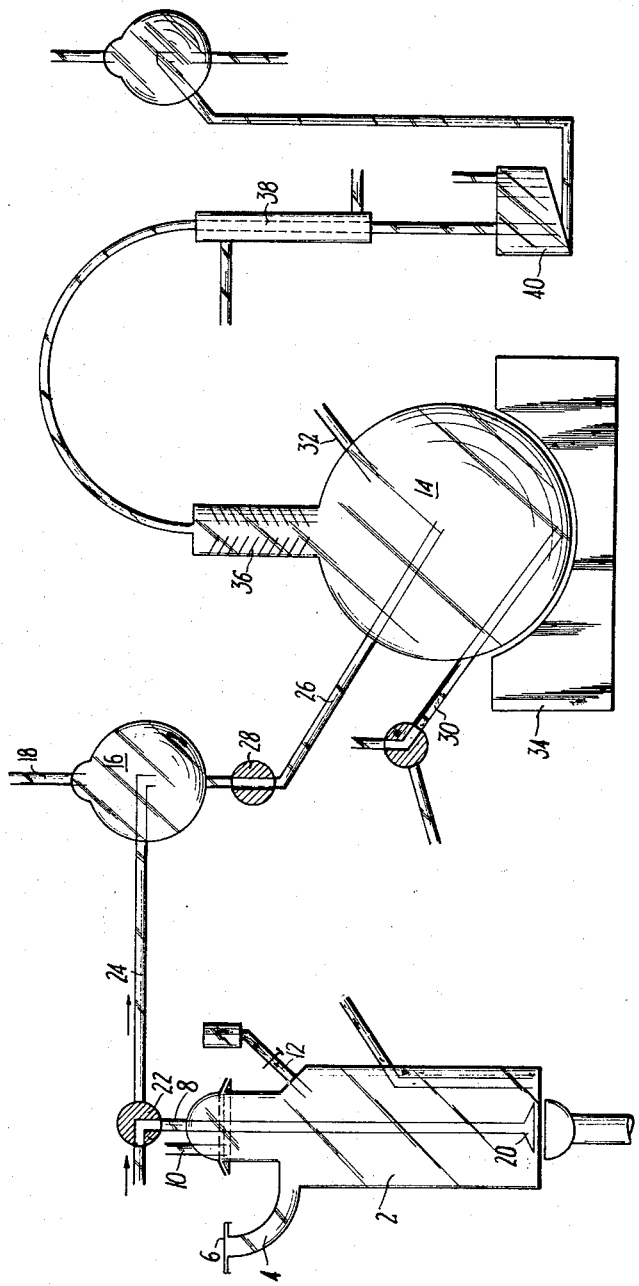

3,179,568
METHOD OF PRODUCTION AND EXTRACTION OF IODINE-131
Elie Hatzopoulos, Athens, Greece, assignor to Commissariat à l'Energie Atomique, Paris, France
Filed Mar. 4, 1963, Ser. No. 262,556
Claims priority, application France, Mar. 7, 1962, 890,321
5 Claims. (Cl. 176—14)

The present invention relates to a method of production and extraction of iodine-131 and, more particularly, to a method of production using oxygen-containing compounds of tellurium, such as tellurous anhydride and telluric acid.

The 131 radioactive isotope of iodine is prepared by irradiation of tellurium, in the pure state or as an oxygen-containing compound, by neutrons in a pile. The capture of a neutron by tellurium-130 yields by an (n,γ) reaction, the 131 radioactive isotope of tellurium, decay of which provides iodine-131 which is itself a β emitter. The problem then consists of separating the iodine-131 from the compound which has been used for its preparation, this operation being complicated by the radioactivity of the iodine which requires all of the manipulations to be effected remotely.

Among the methods of separation used at present, mention may be made of those which utilise, as the starting material, tellurous anhydride irradiated by neutrons and consisting of dissolving the anhydride in caustic soda, oxydising the tellurite so formed to tellurate by hydrogen peroxide in the presence of a molybdate as a catalyst, then acidifying the solution and distilling off the iodine-131 under a neutral atmosphere. This process gives good results, but it is very difficult to carry out. In particular, the oxydation of tellurium from the valence 4 to the valence 6 only proceeds correctly under extremely rigorous conditions.

The present invention contemplates the provision of a method which makes easier the operations of separation of the iodine and the provision of a product which is highly purified and of increased activity.

According to the invention, a method of production and extraction of iodine-131 from an oxygen-containing compound of tellurium comprises irradiating such compound with a neutronic flux, precipitating the tellurium compound with barium hydroxide as a tellurite or tellurate, crystallising the latter by heating the solution to liberate the iodine which it contains, acidifying the solution to convert the iodine to a volatile state and then distilling off the iodine, recovering the head fractions which contain substantially all the iodine.

In most cases, the starting compound of greatest interest is telluric acid, $H_2TeO_4, 2H_2O$, which is of crystalline form at ordinary temperatures. This substance is irradiated in a nuclear reactor channel under a neutron flux. If irradiation is carried out in a swimming-pool reactor, where the temperature is not so high, no heating problem arises. In a pile moderated with heavy water or graphite, it is necessary to choose the channel where the irradiation is effected so as to limit the temperature to a value below 130° C., as the acid loses its two molecules of water of crystallisation at this temperature. The overall temperature range is 50° to 120° C.

In the methods of extraction generally utilised up to the present, telluric acid or tellurous anhydride is dissolved in a caustic soda solution, NaOH. The invention proposes, on the contrary, to precipitate the acid in the form of a tellurate, such as by means of barium hydroxide, $Ba(OH)_2$, according to the reaction:

$$H_2TeO_4 \cdot 2H_2O + Ba(OH)_2 \rightarrow BaTeO_4 + 4H_2O$$

This acid-base neutralisation reaction is very rapid, even when operating with solid telluric acid.

The tellurate formed at the ambient temperature has the form of a voluminous amorphous precipitate, filtration of which is difficult. Also, as it is in a colloidal state, this precipitate adsorbs a large part of the iodine-131. Therefore, by heating, crystallisation of the tellurate and liberation of the iodine, which passes into solution, are caused.

The quantity of iodine liberated increases with temperature and the duration in which the latter is established, as shown by Table I below, which corresponds to the irradiation of 0.2 g. of telluric acid for 15 days under a flux of $2 \cdot 10^{13}$ neutrons per sq. cm. per sec., followed by neutralisation with barium hydroxide at the ambient temperature and subsequent heating.

Table I

| Temperature | Activity of the iodine in the filtrate, in mcs., for a period of temperature maintenance of— | | | |
|---|---|---|---|---|
| | 15 mins. | 30 mins. | 45 mins. | 1 hr. |
| 50° C | 0.52 | 0.73 | 0.80 | 0.83 |
| 100° C. (boiling) | 2.90 | 3.20 | 3.40 | 3.60 |

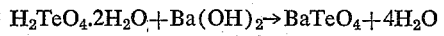

Operation at the ambient temperature leads to an activity of 0.275 mc., or a yield of 3.5%. The yield for a crystallisation carried out for one hour at 100° C. corresponds to an activity of 3.6 mc. in the filtrates and thus only produces a yield of 62%. In order to improve these results, it is necessary to carry out neutralisation at a temperature greater than the ambient temperature, as shown by the following Table II:

Table II

| Temperature | Activity of the iodine in the filtrates, in mcs. | | | |
|---|---|---|---|---|
| | 15 mins. | 30 mins. | 45 mins. | 1 hr. |
| 50° C | 0.60 | 0.92 | 0.98 | 0.99 |
| 100° C. (boiling) | 3.50 | 3.90 | 4.30 | 4.50 |

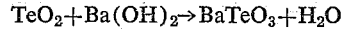

Table II shows that the radioactivity increases with temperature and the duration of treatment. The best yield of iodine-131 is attained in practice by neutralisation at the boiling point for one hour. The yield is then 80%.

The reaction of tellurous anhyride, $TeO_2$, with the hydroxide, $Ba(OH)_2$, is a slow, heterogeneous phase, solid-liquid reaction, favoured by treatment at elevated temperature and agitation. This reaction takes place according to the formula:

$$TeO_2 + Ba(OH)_2 \rightarrow BaTeO_3 + H_2O$$

In the cold, the tellurite formed, $BaTeO_3$, is a colloidal precipitate which becomes crystalline on elevation of the temperature.

The use of barium hydroxide in preference to some other alkaline earth hydroxide (e.g., calcium or strontium) is coupled with its solubility at elevated temperatures which permits reduction of the volume of the solution and thus the size of the apparatus.

Referring to the accompanying drawing, an example of the method of the invention is described below, by way of illustration only. The drawing shows diagrammatically an apparatus for dissolution of the compound and distillation of the solution referred to above The iodine-131 is separated by distillation after precipitation of the tellurium. Before this operation, it is necessary, however, to add entrainers (constituted by I⁻ and IO₃⁻ anions provided by alkali metal iodides and iodates), to oxydise the residual tellurium of valence 4 to valence 6 (without which the tellurium retains the iodine in the form of an iodine-tellurium complex of poorly defined composition) and to take up the iodine in acid solution.

It is not possible to eliminate the tellurium completely by precipitation. Oxidation of the residual tellurium in order to convert it from the valence 4 to the valence 6 should be effected in a basic medium to avoid losses of iodine. For this purpose, the solution (still containing barium hydroxide) has concentrated hydrogen peroxide added to it. No catalyst is necessary.

It is then possible to add sulphuric acid to adjust the solution to 6 N normality, a value which is found to be the best. In contrast to the action taken in the standard method, the addition of entrainers in the form of I⁻ and IO₃⁻ anions, before precipitation of the tellurium by barium hydroxide, has no effect on the yield of the extraction of the active iodine. In contrast, the addition of entrainers before distillation improves the yield by 10–20%.

Experience has shown that the addition of entrainers by the introduction of iodides, iodates or even periodates, if desired, into the solution of iodine in acid medium and in the presence of hydrogen peroxide allows 90% of the total iodine to be obtained in the first ccs. of the distillate, even if the iodine is only present in trace amounts.

In a nuclear reactor channel, a cartridge is irradiated containing 160 g. of tellurous oxide, $TeO_2$, or 200 g. of telluric acid, $H_2TeO_4, 2H_2O$ under a flux of the order of $2.10^{13}$ neutrons per sq. cm. per sec., for fifteen days. The cartridge of irradiated compound, is transported into the cell where the treatment is effected.

The treatment apparatus comprise two principal parts, one intended for precipitation and the other for distillation, which are mounted in cascade and provided with liquid-displacement, agitation and other devices which are remotely controlled in accordance with conventional nuclear practice.

The precipitator 2 is provided with a side tube 4 closed by a sealed and demountable cover 6. Into the precipitator, 1.5 litres of distilled water is introduced which is heated to boiling and then the necessary quantity of solid barium hydroxide is added. Barium hydroxide, $Ba(OH)_2.8H_2O$, is soluble in water at 80° C. in the amount of about 100 g. per 100 ccs.

The dissolution is accelerated by agitation by means of compressed air introduced into the solution through a pipe 8. The air is removed through an outlet conduit 10.

The irradiated compound is introduced gradually into the solution through the tube 12 and heating is maintained for 1 hour with rigorous agitation. The tellurium precipates entirely in the form of its barium salt. During the subsequent cooling, the excess barium hydroxide precipitates, as it is only slightly soluble in cold water.

The solution of iodine occupying the precipitator 2 is transferred to the distillation flask 14 through the intermediary of a bulb syphon 16 of suitable form. This syphon is provided with a vacuum take-off 18 allowing aspiration of the solution through a sintered glass filter 20, the pipe 8, a three-way valve 22 and a tube 24.

From the syphon 16, the solution flows under gravity into the flask 14 through a tube 26 provided with a stopcock 28.

The aqueous solution contained in the flask 14 is agitated by the introduction of nitrogen or even air through a conduit 30 while a reagent intended to introduce entrainer ions, I⁻ and IO₃⁻, is added through an inlet 32. This reagent is constituted, for example, by alkali metal iodides and iodates in aqueous solution, containing about 400μg. of iodine. The reaction mixture is then gently heated under nitrogen under reflux.

Oxidation of the solution is effected by the introduction of 50 to 100 ccs. of pure hydrogen peroxide through the inlet 32. After a quarter of an hour, the solution is adjusted to 6 N normality by the addition of sulphuric acid. The barium hydroxide which has passed with the solution into the flask 14 precipitates in the form of barium sulphate, $BaSO_4$. These operations take place at ordinary temperature under a nitrogen atmosphere.

Distillation under reflux takes place under nitrogen by heating the flask 14 by any suitable heating system 34. The neck 36 of the flask 14 constitutes an upright condenser and extends into a downward condenser 38. The iodine is recovered in 10 ccs. of a solution of N/100 caustic soda contained in an ampoule 40. The first 30 ccs. distilled over contain 60% of the iodine-131 and, by continuing until about 100 ccs. is obtained, about 80–90% of the total iodine is recovered which was present in the initial acid or the anhydride.

Rinsing of the receptacles in the apparatus and evacuation of the residual radio-active effluents are effected by known procedures which do not require to be described in detail.

The active iodine recovered is of high chemical purity.

The treatment apparatus is simple and the duration of the operation is about 4 hours.

What I claim is:

1. A method of production of iodine-131 which comprises subjecting a compound of tellurium selected from the group consisting of tellurium oxide and telluric acid to neutron irradiation resulting in the production of iodine-131, precipitating the resultant compound in an aqueous solution of an alkaline earth as an iodine-containing salt, heating the solution to crystallise said precipitate and thereby liberate the iodine and separately recovering the iodine by distillation.

2. A method as described in claim 1 in which the said solution is a solution of barium hydroxide.

3. A method as described in claim 1 in which the solution is acidified to convert the iodine to a volatile state prior to distillation.

4. A method as described in claim 1 in which at least one entrainer selected from the group consisting of alkali metal iodides, alkali metal, iodates and alkali metal periodates is added prior to distillation of the iodine.

5. A method as described in claim 1 in which the tellurium compound is irradiated at a temperature of from 50°–120° C.

References Cited by the Examiner

FOREIGN PATENTS 877,333   9/61   Great Britain.
877,335   9/61   Great Britain.

CARL D. QUARFORTH, *Primary Examiner.*

REUBEN EPSTEIN, *Examiner.*